UNITED STATES PATENT OFFICE.

JAMES K. ANDERSON, OF WAUKESHA, WISCONSIN.

ARTIFICIAL MINERAL WATER.

SPECIFICATION forming part of Letters Patent No. 580,332, dated April 6, 1897.

Application filed December 7, 1896. Serial No. 614,845. (No specimens.)

*To all whom it may concern:*

Be it known that I, JAMES K. ANDERSON, a citizen of the United States, residing at Waukesha, in the county of Waukesha and State of Wisconsin, have invented certain new and useful Improvements in Artificial Mineral Waters; and I do hereby declare the following to be a full, clear, and exact description of the invention, such as will enable others skilled in the art to which it appertains to make and use the same.

This invention relates to artificial mineral waters.

The object is to produce a mineral water which, while being grateful to the taste and refreshing, shall exhibit certain remedial agents in elegant and at once most rational form to get their conjoint and best possible action.

The object is, furthermore, to produce a mineral water which may act as a mild refrigerant, as a diuretic, and as an antiseptic, and which may also have beneficial and curative effect in diseases of the alimentary canal and the kidneys and bladder, such as excessive uric acid, a gouty diathesis, and catarrhal affections, and in many forms of skin diseases.

With these objects in view the invention consists generally in a lithiated water containing boric acid in solution; furthermore, in a mineral water consisting of carbonic-acid water or so-called "carbonated" water containing in solution lithium in any suitable form and boric acid.

The invention consists, specifically, in a mineral water composed of carbonic-acid or other water, lithium carbonate, and boric acid in about the proportions of thirty-five grains of the carbonate and fifteen grains of the acid to a gallon of the water.

To carry my invention into effect, I proceed as follows: To any suitable quantity of good drinking-water I add a suitable salt of lithia, preferably the carbonate, in the proportion of thirty-five grains to the gallon and boric acid in the proportion of fifteen grains to the gallon, effect solution, and may then charge the solution with carbonic acid to the degree desired, or I may charge the water first and then effect solution of the ingredients, as in a closed vessel.

Instead of taking ordinary drinking-water I may take a lithiated water and supply boric acid thereunto; if more lithia should be required, then supplying this in excess to what the water contains, so as to give the proper proportion.

It will be understood that other ingredients may be added to this mineral water without departing from the spirit of my invention, which is to present an artificial mineral water comprising lithium in any suitable form and boric acid in composition.

A specific method of procedure to produce a good water of the kind is as follows: I prepare a carbonated water by charging the pure water with carbonic-acid gas. I then dissolve the lithium carbonate and boric acid separately in pure water, mix the solutions, filter, if necessary, and add the carbonated water to the solutions in such proportions that the resulting mixture shall contain about thirty-five grains of lithium carbonate and fifteen grains of boric acid to the gallon.

Having thus fully described my invention, what I claim as new, and desire to secure by Letters Patent, is—

1. A mineral water consisting of carbonic-acid water containing, in solution, a form of lithium and boric acid, substantially as described.

2. An artificial mineral water consisting of carbonic-acid water, lithium carbonate and boric acid in about the proportions of thirty-five grains of the carbonate and fifteen grains of the acid to a gallon of the water, substantially as described.

3. The herein-described process of making an artificial mineral water, which consists in taking water, adding thereto a salt of lithia and boric acid in about the proportions specified, effecting solution, and then charging the solution with carbonic acid to the degree desired, substantially as described.

4. A potable water containing lithium carbonate and boric acid in about the proportions of thirty-five grains of the carbonate and fifteen grains of boric acid to the gallon, substantially as described.

In testimony whereof I affix my signature in presence of two witnesses.

JAMES K. ANDERSON.

Witnesses:
JAMES M. KERR,
FLORENCE KELLOGG.